(12) United States Patent
Furman et al.

(10) Patent No.: US 7,593,488 B2
(45) Date of Patent: Sep. 22, 2009

(54) METHOD AND APPARATUS FOR DETECTION OF SIGNAL WITHOUT THE AID OF TRAINING SEQUENCE

(75) Inventors: William Nelson Furman, Fairport, NY (US); Eric Norman Koski, Fairport, NY (US)

(73) Assignee: Harris Corporation, Melbourne, FL (US)

( * ) Notice: Subject to any disclaimer, the term of this patent is extended or adjusted under 35 U.S.C. 154(b) by 635 days.

(21) Appl. No.: 10/422,957

(22) Filed: Apr. 25, 2003

(65) Prior Publication Data

US 2004/0213359 A1 Oct. 28, 2004

(51) Int. Cl.
H03D 1/00 (2006.01)
H03M 13/03 (2006.01)
(52) U.S. Cl. ...................... 375/340; 714/792
(58) Field of Classification Search ............ 375/327, 375/328, 262, 265, 340, 341; 714/792, 794, 714/795, 796; 700/52, 73
See application file for complete search history.

(56) References Cited

U.S. PATENT DOCUMENTS

| | | | | |
|---|---|---|---|---|
| 4,501,020 A * | 2/1985 | Wakeman | ................ | 455/226.1 |
| 5,267,244 A * | 11/1993 | Messerschmitt et al. | .... | 370/342 |
| 5,619,507 A * | 4/1997 | Tsuda | ................ | 375/365 |
| 5,661,527 A * | 8/1997 | Ferguson | ................ | 348/558 |
| 5,703,954 A * | 12/1997 | Dapper et al. | ................ | 381/15 |
| 5,974,098 A * | 10/1999 | Tsuda | ................ | 375/340 |
| 6,289,057 B1 * | 9/2001 | Velez et al. | ................ | 375/317 |
| 6,317,456 B1 * | 11/2001 | Sayeed | ................ | 375/227 |
| 6,349,120 B1 * | 2/2002 | Shi et al. | ................ | 375/316 |
| 6,760,370 B2 * | 7/2004 | Li et al. | ................ | 375/227 |
| 2001/0022790 A1 * | 9/2001 | Porcino | ................ | 375/316 |
| 2001/0026598 A1 * | 10/2001 | Porcino | ................ | 375/334 |
| 2002/0154620 A1 * | 10/2002 | Azenkot et al. | ............ | 370/347 |
| 2003/0157965 A1 * | 8/2003 | Marro et al. | ................ | 455/560 |
| 2003/0171900 A1 * | 9/2003 | Desai | ................ | 702/190 |
| 2004/0101035 A1 * | 5/2004 | Boer et al. | ................ | 375/219 |
| 2005/0018750 A1 * | 1/2005 | Foerster et al. | ............ | 375/130 |

OTHER PUBLICATIONS

"IEEE 100," The Authoritative Dictionary of IEEE Standards Terms Seventh Edition, IEEE Press Publications, 2000, p. 2.*

* cited by examiner

Primary Examiner—Khai Tran
(74) Attorney, Agent, or Firm—Duane Morris LLP

(57) ABSTRACT

Embodiments of a method and system for determining the presence or absence of a digital communication signal are disclosed. One embodiment of the inventive method comprises the steps of collecting a plurality of signal samples at a selected frequency for a known period of time, determining a metric dependent upon at least one measured characteristic associated with the collected signal samples, and indicating signal status as present when said determined metric is greater than a known value. In another embodiment, the aforementioned method may indicate the signal status as absent when the determined metric is less than the known value. As should be appreciated, embodiments of the inventive method may be used to determine the known value by determining the metric performance for a plurality of samples for a plurality of signal conditions.

16 Claims, 5 Drawing Sheets

METHOD AND APPARATUS FOR DETECTION OF SIGNAL WITHOUT THE AID OF TRAINING SEQUENCE

BACKGROUND OF THE INVENTION

Many communication systems or networks, both wired, e.g., Ethernet, and wireless, e.g., HF, VHF, UHF, radio, utilize a form of Carrier Sense Multiple Access ("CSMA") to determine whether a frequency or radio channel is being used by another station or stations before using the frequency or channel. However, this technique does not work well in the noise- and interference-rich environment of radio communications. In some systems, a known sequence, i.e., a training sequence, is interspersed in modem waveforms to assist in signal detection and channel tracking.

However, signal detection of standard HF modem waveforms is further hampered by the use of heavily filtered Phase Shift Keyed ("PSK") waveforms (e.g., M-PSK). These waveforms are extremely noise-like in nature and difficult to distinguish from background noise and interference. Without the presence of the training sequence, the ability to determine the presence or absence of these waveforms is extremely difficult to achieve.

Hence, there is a need in the industry for a system that is able to determine the presence or absence of a PSK signal without the need of a training sequence. Embodiments of the present invention are related to the field of digital communications and more specifically determining whether a communication signal is present or absent to meet the above-identified needs. More specifically, methods and systems for determining the presence or absence of a digital communication signal are disclosed. One method comprises the steps of collecting a plurality of signal samples at a selected frequency for a known period of time, determining a metric dependent upon at least one measured characteristic associated with the collected signal samples, and indicating signal status as present when the determined metric is greater than a known value. In another aspect, the method may indicate the signal status as absent when the determined metric is less than said known value. Other embodiments of the present inventive method may further be used to determine the known value by determining a metric for a plurality of samples for a plurality of signal conditions.

Figure 1:
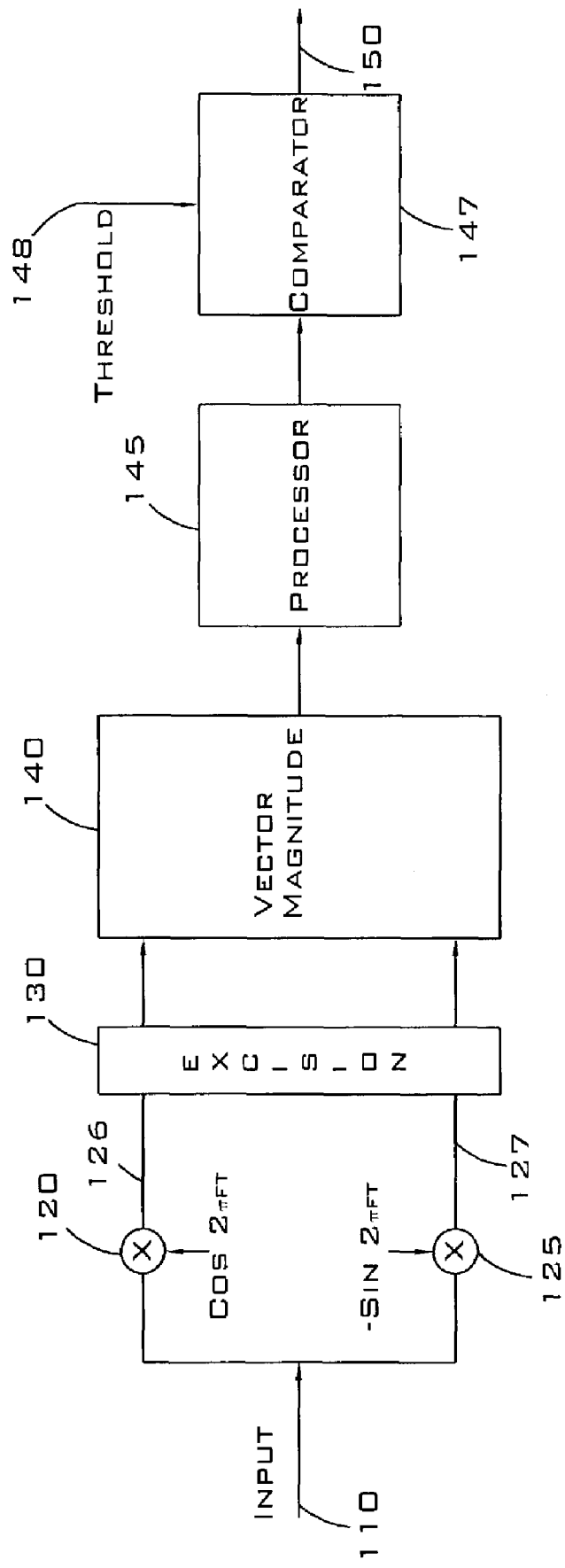
FIG. 1 illustrates a block diagram of a detection circuit in accordance with the principles of the invention.

It is to be understood that these drawings are solely for purposes of illustrating the concepts of the invention and are not intended as a definition of the limits of the invention. The embodiments shown in FIGS. 1 through 5 and described in the accompanying detailed description are to be used as illustrative embodiments and should not be construed as the only manner of practicing the invention. Also, the same reference numerals, possibly supplemented with reference characters where appropriate, have been used to identify similar elements.

DETAILED DESCRIPTION

FIG. 1 illustrates a block diagram of an exemplary PSK receiving system 100 in accordance with the principles of the invention. In this exemplary system, a digital signal 110 is conventionally applied to multipliers 120, 125, which demodulate digital signal 110 into an in-phase and quad-phase component, 126, 127, respectively. The demodulated components are optionally applied to excision 130 to remove any narrow-band signal, e.g., tone jammer, that may be superimposed on signal 110. The demodulated signals are then applied to vector magnitude determinator 140. Determination of signal vector magnitude values as a complex value, i.e., magnitude and phase, is well known in the art. For example, real magnitude may be determined as the square root of the sum of the squares of the in-phase 126 and quad-phase 127 components of the signal.

The vector magnitudes are then applied to processor 145 to determine characteristics of the received signal over a known period of time. In a preferred aspect of the invention, the determined characteristics are the mean and variance of the real magnitude of the complex value associated with the collected sample. Processor 145 is further operable to determine a metric value associated with the determined characteristics. The determined metric is then applied to comparator 147 concurrently with a known threshold value 148. An indication 150 of signal presence occurs when the determined metric value is greater than the known threshold. Otherwise, an indication of no signal detected is provided.

Figure 2:
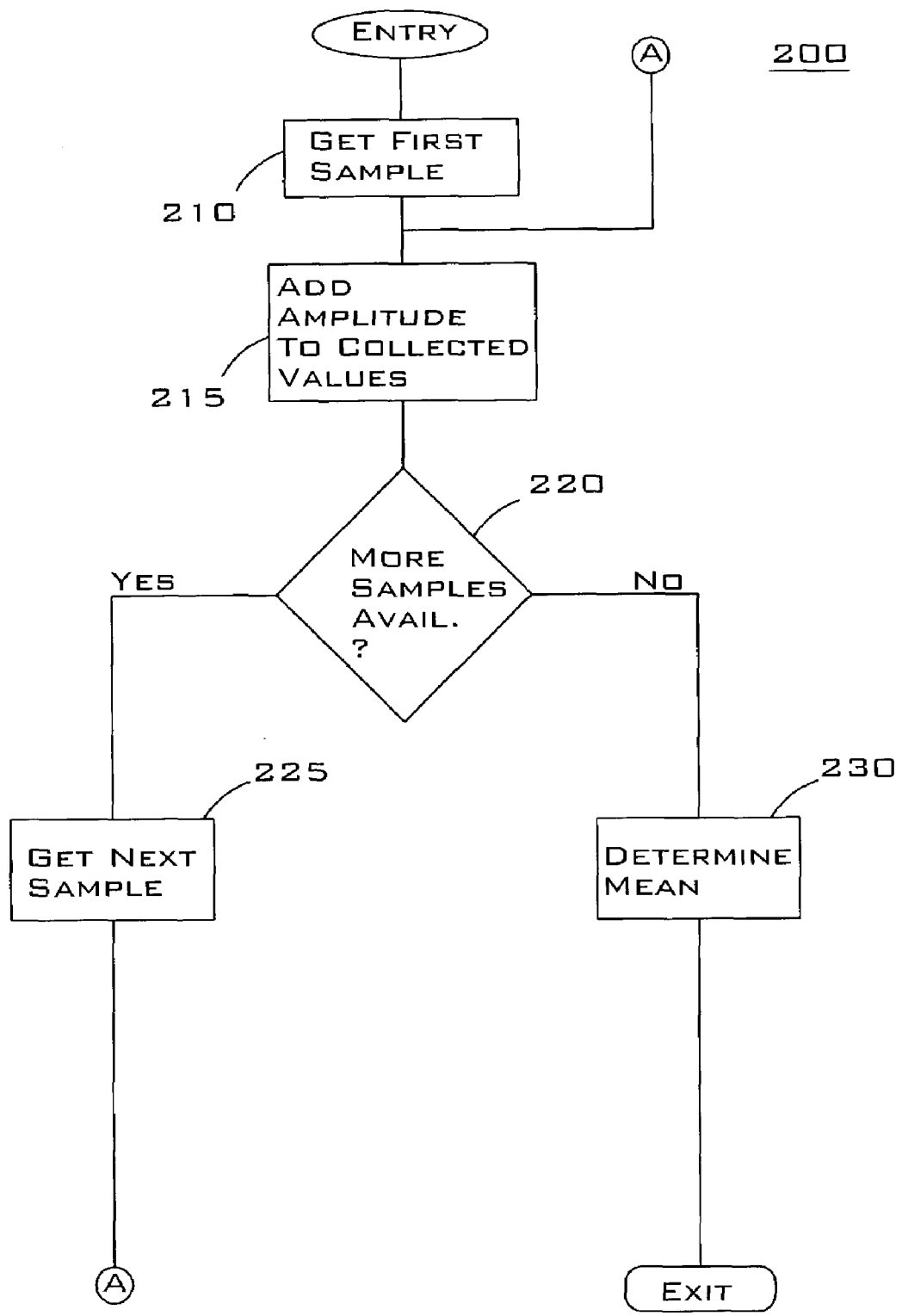
FIG. 2 illustrates a flow chart of an exemplary process for determining a first signal characteristic in accordance with the principles of the invention.

FIG. 2 illustrates a flow chart 200 of an exemplary process for determining a preferred first characteristic value as a real magnitude of the complex magnitude, i.e., amplitude, associated with the signals received during a known time period. In the preferred embodiment, shown in FIG. 2, a mean value of the complex vector amplitudes associated with the collected signal samples may be determined as:

$$\bar{A} = \frac{\sum_{n=1}^{N} A_n}{N} \quad [1]$$

In this preferred embodiment, a first sample is obtained at block 210. The amplitude associated with the sample is added to an accumulated sum of amplitudes at block 215. A determination is made at block 220 whether more samples are available. If the answer is in the affirmative, then a next sample is obtained at block 225 and processing continues at block 215. However, if the answer is in the negative, then a mean value is determined in accordance with equation 1 at block 230.

Figure 3:
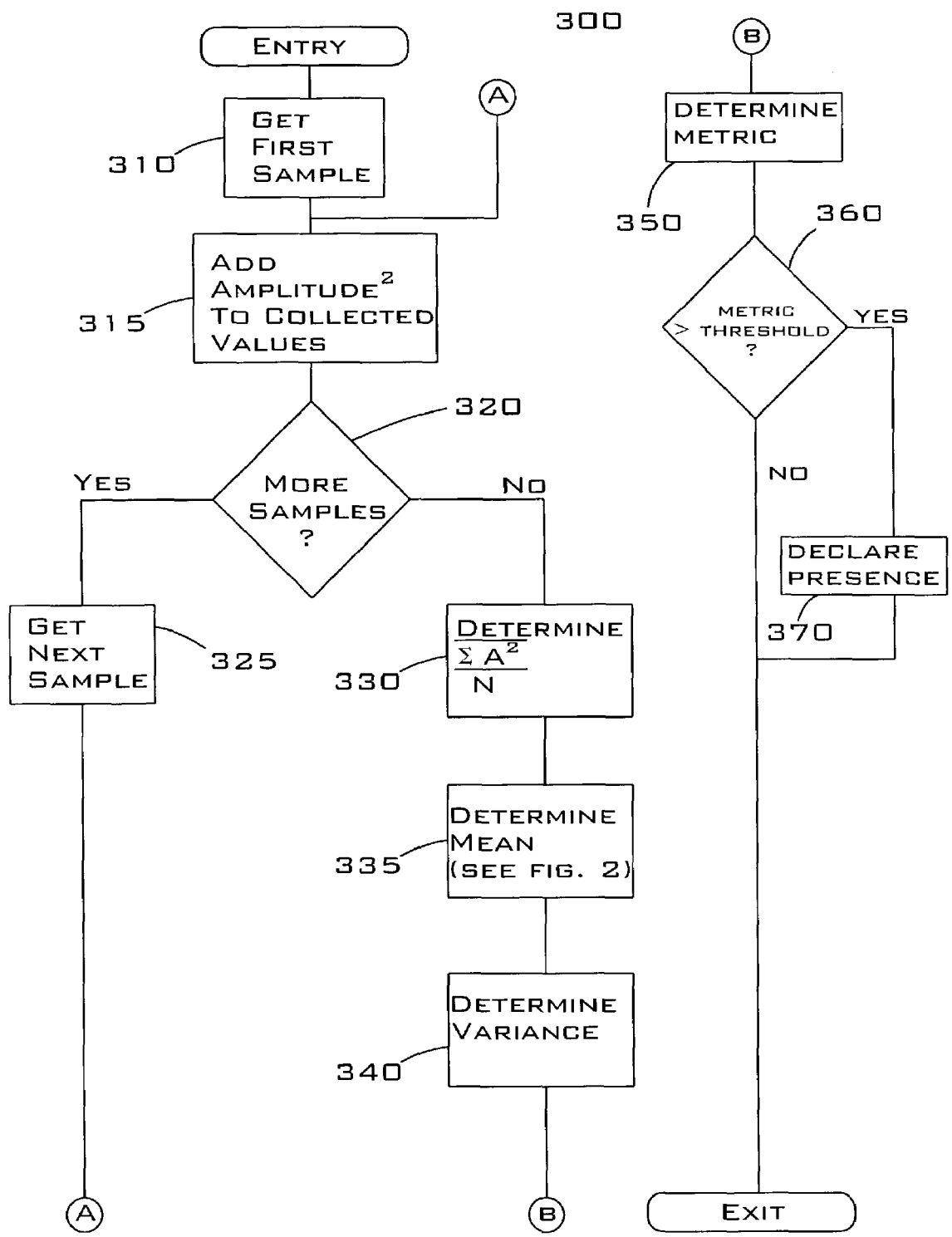
FIG. 3 illustrates a flow chart of an exemplary process for determining a second signal characteristic in accordance with the principles of the invention.

FIG. 3 illustrates a flow chart 300 of an exemplary process for determining a preferred variance value of the amplitudes associated with the signals received during a known time period. In the preferred embodiment shown in FIG. 3, a variance value of the complex vector amplitudes associated with the collected signal samples may be determined as:

$$V = \frac{\sum_{n=1}^{N} A_n^2}{N} - \left(\frac{\sum_{n=1}^{N} A_n}{N}\right)^2 \text{ for } N \gg 1 \quad [2]$$

or more specifically, $$V = \frac{\sum_{n=1}^{N} (A_n - \overline{A})^2}{N} \quad [3]$$

In this preferred embodiment, a first sample is obtained at block 310. The amplitude associated with the sample is squared and added to an accumulated sum of vector magnitudes at block 315. A determination is made at block 320 whether more samples are needed. If the answer is in the affirmative, then a next sample is obtained at block 325 and processing continues at block 315.

However, if the answer is in the negative, then an average value of the squares of the vector magnitudes or amplitude values is determined at block 330. At block 335, a mean value of the collected amplitudes is determined, similar to the process shown in FIG. 2. At block 340, a variance value, in accordance with equation 2, is then determined.

As would be understood, the received data samples are collected over a known period of time. In one aspect of the invention, the period is preferably 450 milliseconds. In a second aspect, the period is 900 milliseconds. However, it would be appreciated that any time period that provides for sufficient data sample collection may be selected without altering the scope of the invention.

A performance metric may be determined at block 350 in relation to the first and second measured characteristic, in the preferred embodiment mean and variance, as:

$$m = \frac{\overline{A}^2}{V} \quad [4]$$

where m is the metric value;
$\overline{A}$ is the mean value; and
V is the variance.

In this case, the ratio shown in equation 3 provides an indication of dispersion of the received demodulated samples in IQ vector space. A low dispersion value indicates the received signal resembles a PSK signal received with an unknown sub-carrier frequency offset.

At block 360, a determination is made whether the determined metric is greater than a known threshold value. If the answer is negative, then processing is ended. However, if the answer is in the affirmative, then the signal status is deemed present at block 370.

Although the present invention has been described in accordance with a preferred embodiment of the invention, it should be appreciated that other similar metrics based on statistical characteristics of the received signal sample, such as geometric mean, harmonic mean, weighted mean, mode, median, quartile, percentiles, mean deviation, standard deviation, root mean square, etc., may also be used without altering the scope of the invention.

Figure 4:
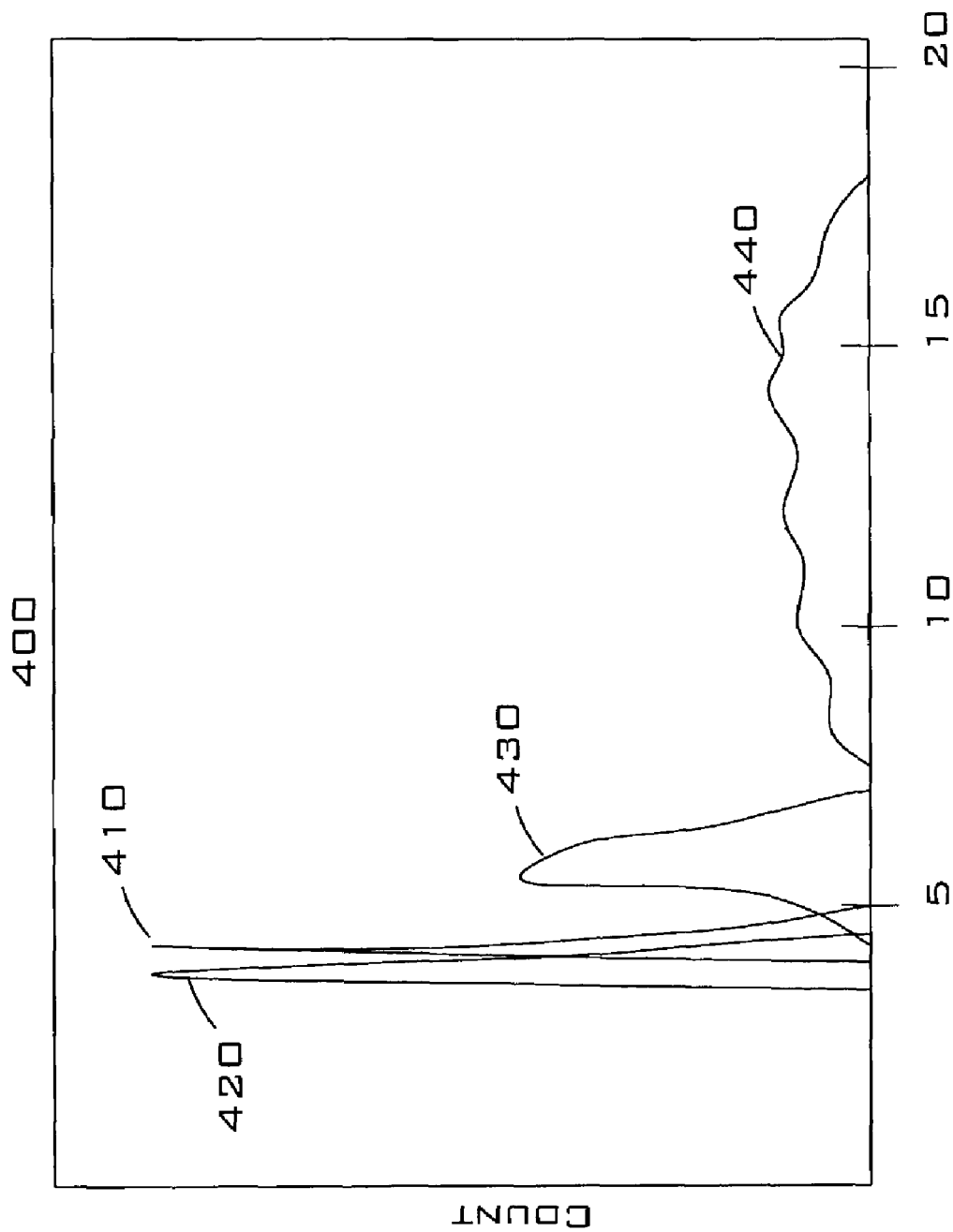
FIG. 4 illustrates a chart of measured performance in accordance with the principles of the present invention.

FIG. 4 illustrates the performance metric shown in equation 3 using a plurality of samples associated with different signal conditions. Histogram 410 is representative of a plurality of metric values determined by equation 1 for a no signal and an on-air noise only condition. Histogram 420 is representative of a plurality of metric values determined by equation 1 for a white-Gaussian noise only signal. Histogram 430 is representative of a plurality of metric values determined by equation 1 for a signal having a signal-to-noise ratio of 2 dB. Histogram 440 is representative of a plurality of metric values determined by equation 1 for a signal having a signal-to-noise ratio of 10 dB. As should be appreciated, no signal or noise only signals have a large dispersion and a corresponding small metric value. On the other hand, relatively high SNR signals have a small dispersion and a corresponding large metric value.

FIG. 4 further illustrates a metric related threshold value that may be used in comparator 147 of FIG. 1 to determine the presence of a signal. In this case, a value of four (4) units may be selected as a threshold value in comparator 147 that may be used to determine the presence of signal. Hence, data collected having a metric value less than the selected threshold are classified "not-present," while data collected having a metric value greater that the selected threshold are classified as "present".

Figure 5:
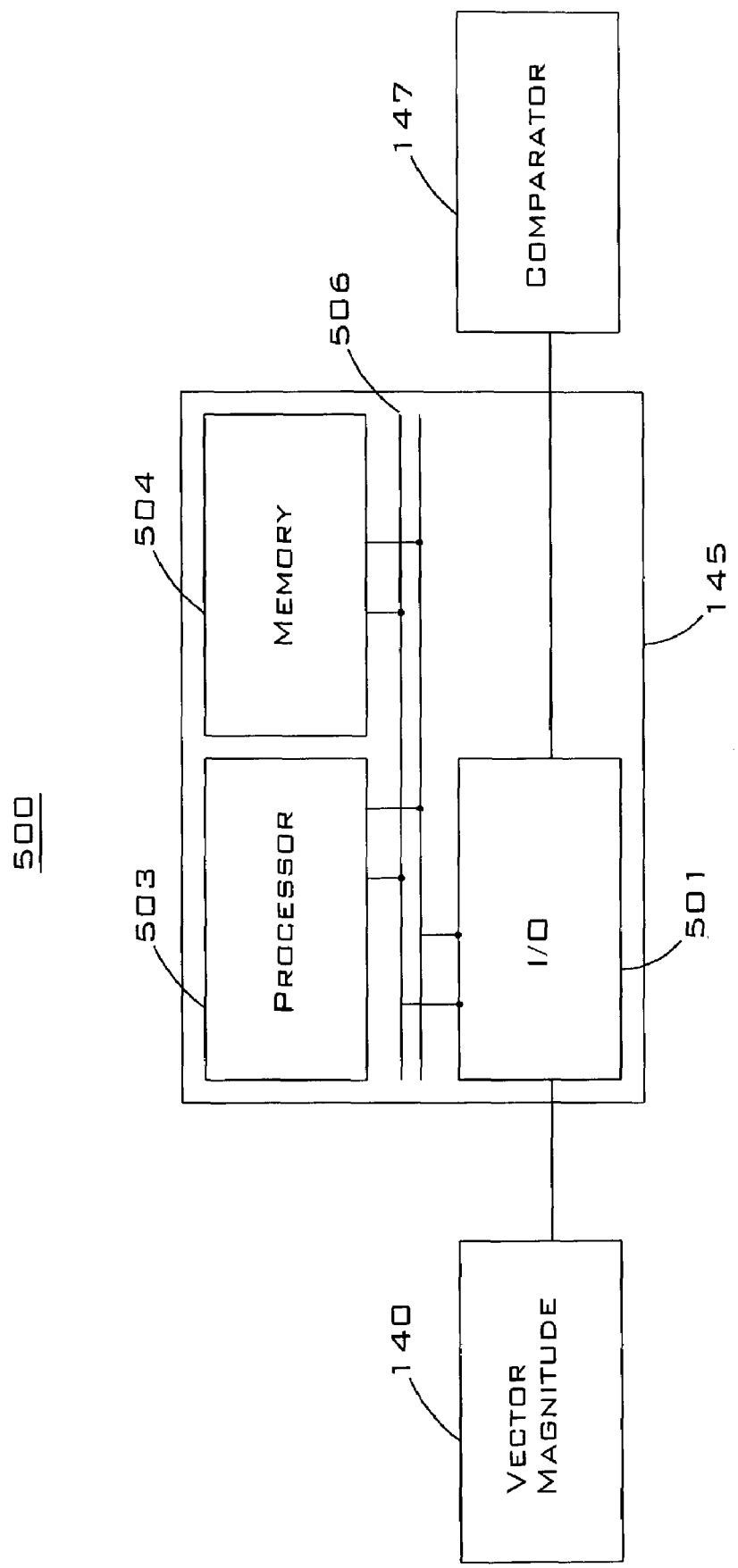
FIG. 5 illustrates a system for executing the processing of the present invention.

FIG. 5 illustrates an exemplary embodiment of a system 500 containing processor 145 that may be used for implementing the principles of the present invention. System 500 may represent a desktop, laptop or palmtop computer, a personal digital assistant (PDA), as well as portions or combinations of these and other devices, and may be embedded in a radio product, cellular phone or other wireless communication device or product. System 500 may contain one or more input/output devices 502, processors 503 and memories 504, that are operable to execute the processing illustrated in FIGS. 2 and 3.

Processor 145 may access vector magnitude determinator 501 that contains information items regarding vector magnitudes associated with the collected samples. Information contained in vector magnitude determinator 501 may be stored in permanent or semi-permanent media, such as RAM, ROM, hard disk drive, optical disk drive or other image storage devices or may also be obtained dynamically and in real-time.

Input/output devices 502, processors 503 and memories 504 may communicate over a communication medium 506. Communication medium 506 may represent, for example, an internal communication bus or network, one or more internal connections of a circuit, circuit card or other apparatus, as well as portions and combinations of these and other communication media. Input data from vector magnitude determinator 501 may be received by I/O device 502 and, in accordance with one or more software programs operable to execute the exemplary processing shown in FIGS. 2 and 3, may be stored in memories 504 and executed by processors 503. The output of the processing, i.e., a metric value, may then be applied to comparator 147 for further processing.

Processors 503 may be any means, such as general purpose or special purpose computing system, or may be a hardware configuration, such as a laptop computer, desktop computer, handheld computer, dedicated logic circuit, integrated circuit, Programmable Array Logic (PAL), Application Specific Integrated Circuit (ASIC), etc., that provides a known output in response to known inputs.

In one embodiment, coding and decoding employing the principles of the present invention is implemented by computer readable code executed by processor 503. The code may be stored in the memory 504 or read/downloaded from a memory medium such as a CD-ROM or floppy disk (not shown) in communication with processor 503 or I/O device 502. In other embodiments, hardware circuitry may be used in place of, or in combination with, software instructions to implement the invention. For example, the elements illustrated herein may also be implemented as discrete hardware elements.

As would be understood, the term processor may represent one or more processing units or computing units in communication with one or more memory units and other devices, e.g., peripherals, connected electrically, electronically, or wirelessly to and communicating with the at least one processing unit. Furthermore, the devices may be electrically, electronically or wirelessly connected to the one or more processing units via internal busses, e.g., ISA bus, microchannel bus, PCI bus, PCMCIA bus, wireless, etc., or one or more internal connections of a circuit, circuit card or other device, as well as portions and combinations of these and other communication media or an external network, e.g., the Internet and Intranet.

While there has been shown, described, and pointed out fundamental novel features of the present invention as applied to preferred embodiments thereof, it will be understood that various omissions and substitutions and changes in the apparatus described, in the form and details of the devices disclosed, and in their operation, may be made by those skilled in the art without departing from the spirit of the present invention. For example, although the present invention has been described with regard to declaring the presence of a digital signal at a known frequency, it would be within the knowledge of one skilled in the art to provide to indication when presence is detected and an indication when a signal is not detected. Accordingly, while the word "presence" is used to describe the present invention, the determination of the "absence" of a signal is also contemplated to be within the scope of the invention. It should further be appreciated that the present invention is operable when a large frequency offset is present. Hence, the tracking of a frequency offset, which is preformed in conventional modem technology, is not needed for the operation of the present invention.

It is expressly intended that all combinations of those elements that perform substantially the same function in substantially the same way to achieve the same results are within the scope of the invention. Substitutions of elements from one described embodiment to another are also fully intended and contemplated.

What is claimed is:

1. A tunable receiving system comprising:
    means for demodulating a received signal;
    means for isolating desired components from undesired components of said received signal;
    means for collecting a plurality of complex digital signal samples from said desired components at a known frequency for a known period;
    means for determining a real magnitude for each of said plurality of complex digital samples;
    means for determining both a mean and a variance of a plurality of real magnitudes of said complex digital samples;
    means for computing a combined metric based on both of said determined mean and variance; and
    means for indicating a presence of a signal when said combined metric is greater than a known value.

2. The system as recited in claim 1, further comprising: means for altering said known frequency.

3. The system as recited in claim 1, further comprising: means for altering said period for collecting said plurality of complex digital samples.

4. The system as recited in claim 1 wherein said combined metric is determined in relation to said mean squared and said variance.

5. The system of claim 1 wherein said combined metric is a function of a square of a mean value of said real magnitudes divided by a variance value of said real magnitudes.

6. The system of claim 1 wherein said combined metric is a function of a quality of said received signal.

7. The system of claim 1 wherein said received signal is selected from the group consisting of: phase shift keyed (PSK) signal, quadrature phase shift keyed (QPSK) signal, binary PSK signal, offset QPSK signal, and differential PSK signal.

8. The system of claim 1 wherein said means for isolating is an excision filter.

9. In a tunable receiving system, a method to detect a communication signal, the method comprising:
    demodulating a received signal;
    isolating desired components from undesired components of said received signal;
    collecting a plurality of complex digital signal samples from said desired components at a known frequency for a known period;
    determining a real magnitude for each of said plurality of complex digital samples;
    determining both a mean and a variance of a plurality of real magnitudes of said complex digital samples;
    computing a combined metric based on both of said determined mean and variance in the receiving system; and
    indicating presence of the communication signal when said combined metric is greater than a known value.

10. The method as recited in claim 9, further comprising the step of altering said known frequency.

11. The method as recited in claim 9, further comprising the step of altering said period for collecting said plurality of complex digital samples.

12. The method as recited in claim 9 wherein said combined metric is determined in relation to said mean squared and said variance.

13. The method of claim 9 wherein said combined metric is computed as at least a function of a square of a mean value of said real magnitudes divided by a variance value of said real magnitudes.

14. The method of claim 9 wherein said combined metric is computed as a function of at least a quality of said received signal.

15. The method of claim 9 wherein said received signal is selected from the group consisting of: phase shift keyed (PSK) signal, quadrature phase shift keyed (QPSK) signal, binary PSK signal, offset QPSK signal, and differential PSK signal.

16. In a tunable receiving system, a method to detect the presence of a communication signal in a received signal, the method comprising:
    demodulating the received signal;
    isolating, by filtering, desired components from undesired components of said received signal;
    collecting a plurality of complex digital signal samples from said desired components at a known frequency for a known period; wherein one of the plurality of complex digital signal samples comprises a real component I and an imaginary component Q;
    determining a real magnitude Y for each of said plurality of complex digital samples, wherein the real magnitude $Y=\sqrt{I^2+Q^2}$;

determining both a mean (m) and a variance (v) of a plurality of real magnitudes of said complex digital samples;

computing a combined metric $f(m,v)$ that is a function of at least said determined mean and said variance in the receiving system;

comparing the combined metric with a predetermined threshold (C), and indicating the presence of the communication signal when said combined metric $f(m,v)$ is greater than the predetermined threshold (C).

* * * * *